United States Patent
Jung et al.

(10) Patent No.: US 7,576,662 B2
(45) Date of Patent: Aug. 18, 2009

(54) KEYPAD ARRAY OF PORTABLE TERMINAL FOR INPUT OF ALPHABETIC LETTERS

(76) Inventors: Young-Jae Jung, 103-1401, Youngnam-Apt., Jisan2-dong, Susung-gu, Daegu (KR); Hong-Jae Jung, 201-1503, PalgongBosung-Apt., Jimyo-dong, dong-gu, Daegu (KR)

(*) Notice: Subject to any disclaimer, the term of this patent is extended or adjusted under 35 U.S.C. 154(b) by 702 days.

(21) Appl. No.: 11/370,463

(22) Filed: Mar. 8, 2006

(65) Prior Publication Data

US 2007/0222644 A1     Sep. 27, 2007

(51) Int. Cl.
*H03M 11/00* (2006.01)
(52) U.S. Cl. .............................. 341/22; 341/20; 341/28; 345/168; 345/171; 345/173; 379/433.07; 379/268; 400/486
(58) Field of Classification Search .................... 341/20, 341/22, 28; 345/168, 171, 173; 379/433.07; 379/268; 400/486
See application file for complete search history.

(56) References Cited

U.S. PATENT DOCUMENTS

| | | | | |
|---|---|---|---|---|
| 5,124,702 | A | * | 6/1992 | van Ardenne ................ 341/22 |
| 6,356,258 | B1 | * | 3/2002 | Kato et al. .................. 345/168 |
| 2002/0135499 | A1 | * | 9/2002 | Guo ............................ 341/23 |
| 2008/0075517 | A1 | * | 3/2008 | Vuong ....................... 400/486 |
| 2008/0304892 | A1 | * | 12/2008 | Baker ......................... 400/486 |

FOREIGN PATENT DOCUMENTS

| | | | |
|---|---|---|---|
| JP | 2002163067 | A | 6/2002 |
| JP | 2002189554 | A | 7/2002 |
| KR | 20030004230 | A | 1/2003 |
| KR | 1020050029352 | A | 9/2003 |

OTHER PUBLICATIONS

International Search Report, PCT/KR2007/000622, May 25, 2007, 2 pages.

* cited by examiner

*Primary Examiner*—Albert K Wong
(74) *Attorney, Agent, or Firm*—St. Onge Steward Johnston & Reens LLC

(57) ABSTRACT

Disclosed herein is a keypad of a portable terminal including an array of a plurality of alpha-numeric key buttons for the input of alphabetic letters of a language, for example, English. The vowel input portion includes a plurality of key buttons, which are allotted with vowels of English alphabet showing a high frequency of use, and some consonants of English alphabet. The key buttons of the vowel input portion are grouped and arranged at a selected position to achieve a high accessibility of the user's. The consonant input portion includes the remaining key buttons, allotted with the remaining consonants of English alphabet. The consonants and vowels are classified into groups of two or more based on a similarity in geometrical shape thereof, such that each group is allotted to one of the key buttons of both the consonant input portion and the vowel input portion

8 Claims, 5 Drawing Sheets

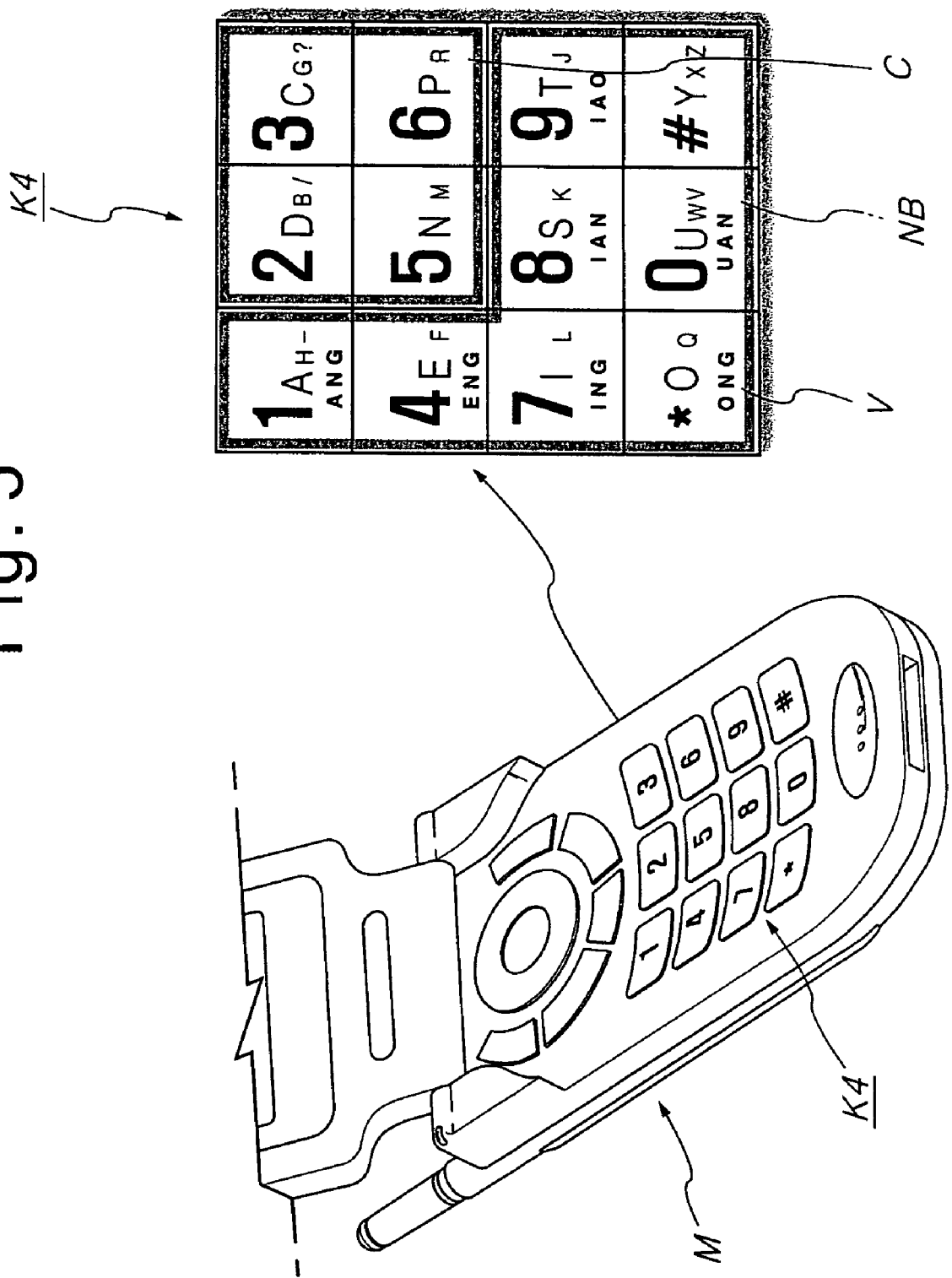

KEYPAD ARRAY OF PORTABLE TERMINAL FOR INPUT OF ALPHABETIC LETTERS

FIELD OF THE INVENTION

The present invention relates to a keypad for use as input means of a portable terminal, and more particularly, to a keypad array of a portable terminal which can ensure an easy input of alphabetic letters of a language, for example, English.

BACKGROUND OF THE INVENTION

Recently, the use of portable terminals, such as cellular phones, PDAs, and GPSs, is rapidly increasing. Most of the portable terminals include a mechanical or physical keypad as an interface between them and a human.

Such a keypad is generally configured as a combination of a plurality of alpha-numeric key buttons. Usually, alphabetic letters included in the alpha-numeric key buttons of the keypad correspond to a language of a nation where the keypad is commercialized.

In the keypad having the above described configuration, accordingly, it is very important to achieve an effective array of a predetermined number of key buttons for the sake of easy message transfer.

The recent spread of cellular phones throughout various cultures around the whole world, including English culture, Chinese culture, and other cultures, has given rise to an increased requirement with respect to an effective keypad array and use suitable for the input of letters of various languages, more particularly, alphabetic letters of inflectional languages.

To fulfill the above mentioned increased requirement, therefore, there is a necessity to provide a new keypad array and input method thereof for achieving an improvement in input efficiency of alphabetic letters of various languages, including English, Chinese, etc., and allowing a keypad to be applicable to various portable terminals that are commercialized in various nations.

SUMMARY OF THE INVENTION

Therefore, the present invention has been made in view of the above requirements, and it is an object of the present invention to provide an improved keypad array of a portable terminal which can provide a user with an easy and rapid identification and association of alphabetic letters, thereby achieving the following advantages: an easy recognition of alphabetic letters allotted to a plurality of key buttons; an effective input of desired letters with minimum physical key button manipulation; and a reduction in input error and operative mistake.

In the following detailed description, it should be understood that the present invention explains a keypad input method in association with specific languages including English and Chinese languages, but is not limited thereto, and the present invention is advantageously applicable to alphabetic letters of other various inflectional languages, such as for example, German, Spanish, and French, which have consonantal and vowel shapes similar to English alphabet.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a plan view illustrating a conventional portable terminal keypad for use in the input of pronunciation of Chinese characters in accordance with a fourth embodiment of the present invention

DETAILED DESCRIPTION OF THE INVENTION

Now, preferred embodiments of a keypad of a portable terminal for use in the input of alphabetic letters in accordance with the present invention will be explained with reference to the accompanying drawings, via the comparison with the prior art.

Figure 1:
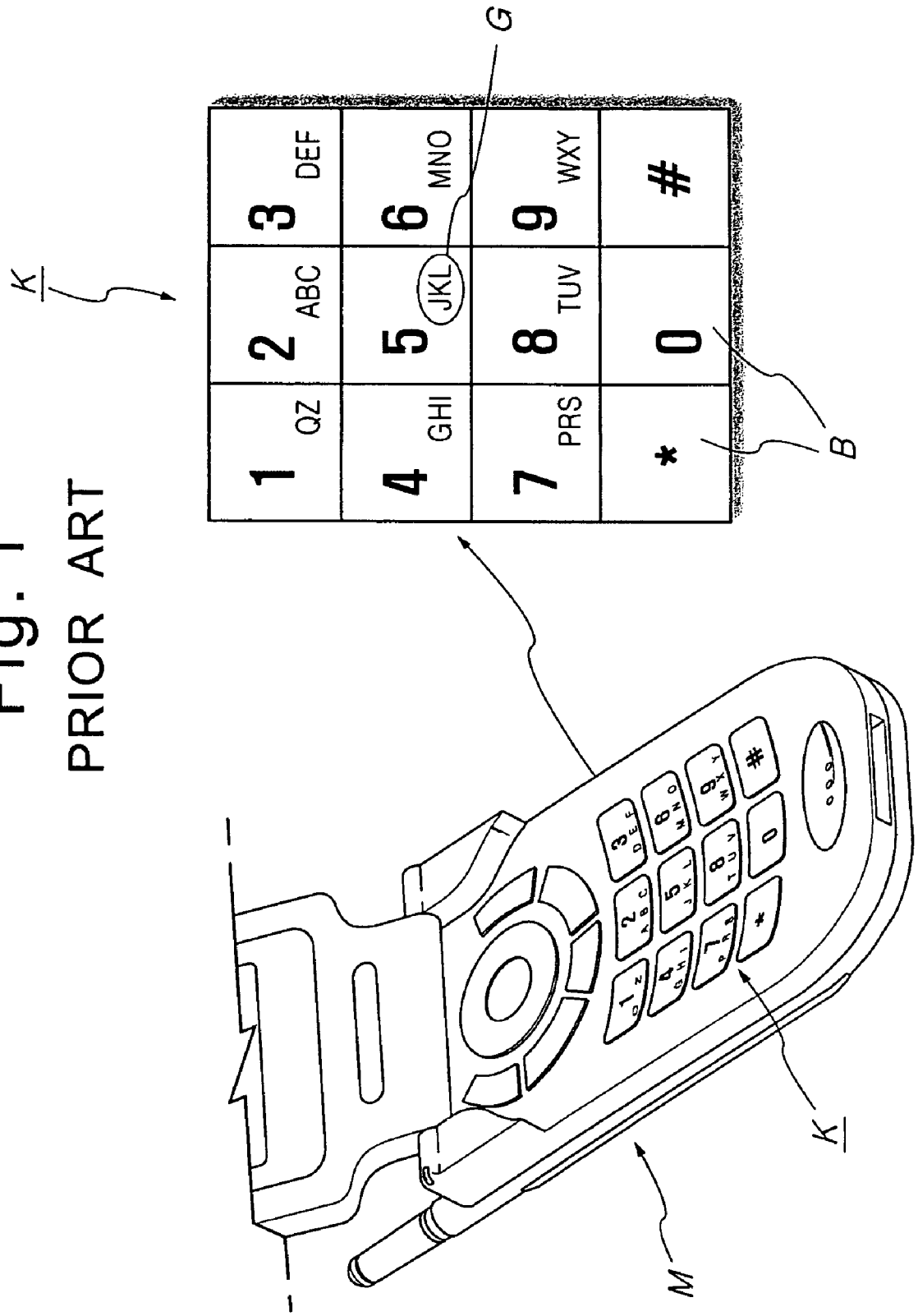
FIG. 1 is a plan view illustrating a conventional portable terminal keypad for use in the input of alphabetic letters.
Figure 2:
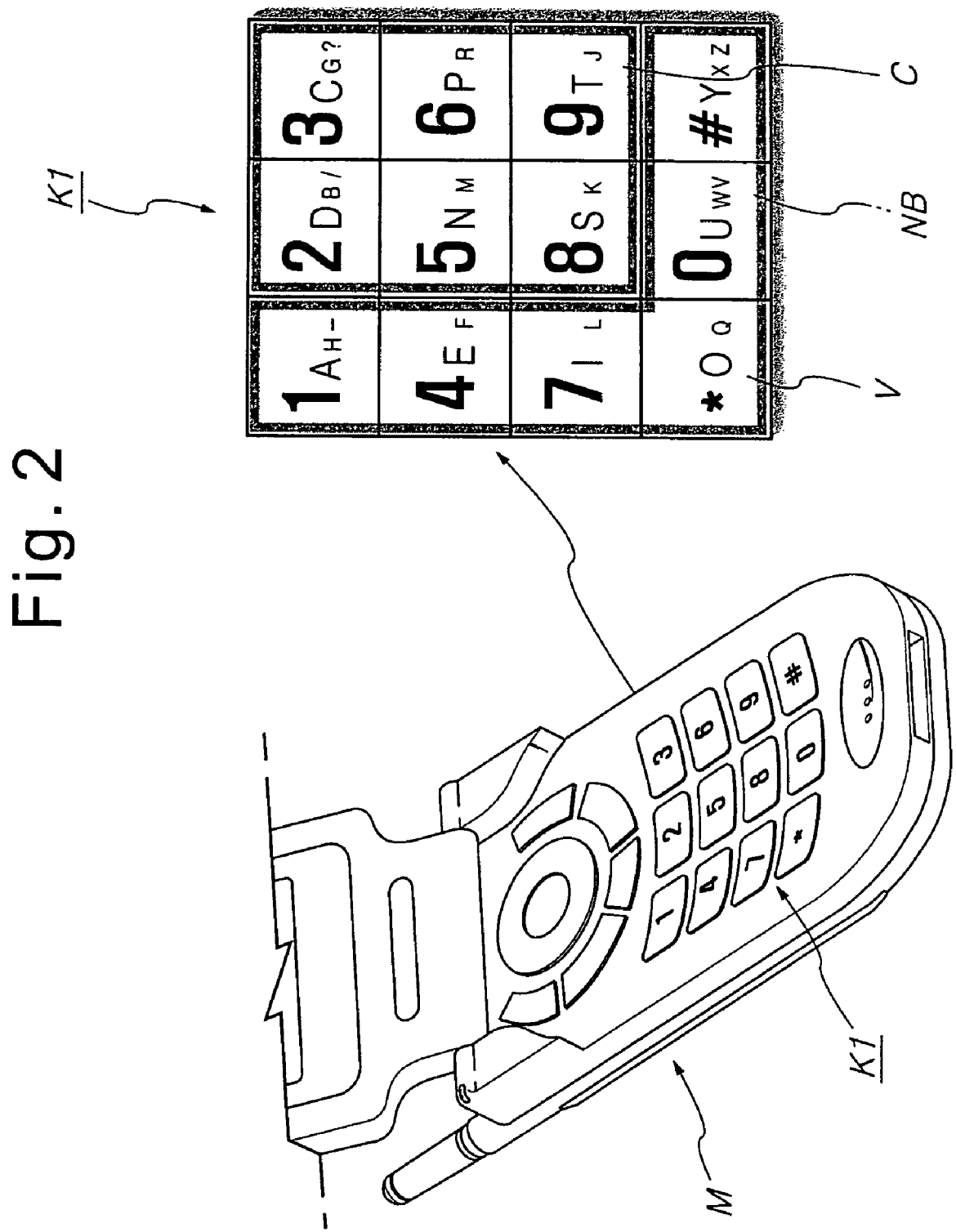
FIG. 2 is a plan view illustrating a conventional portable terminal keypad for use in the input of alphabetic letters in accordance with a first embodiment of the present invention.
Figure 3:
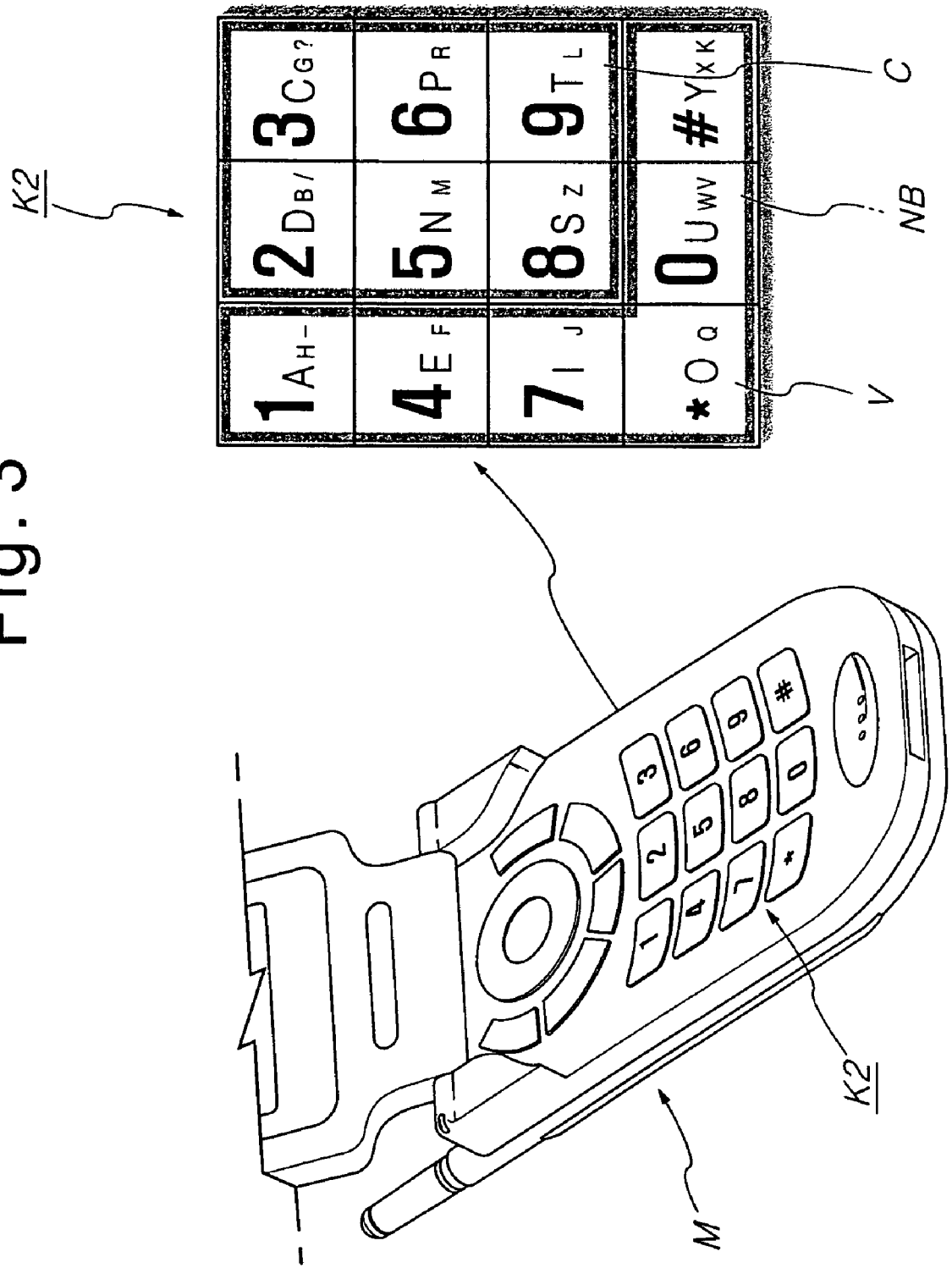
FIG. 3 is a plan view illustrating a conventional portable terminal keypad for use in the input of alphabetic letters in accordance with a second embodiment of the present invention.
Figure 4:
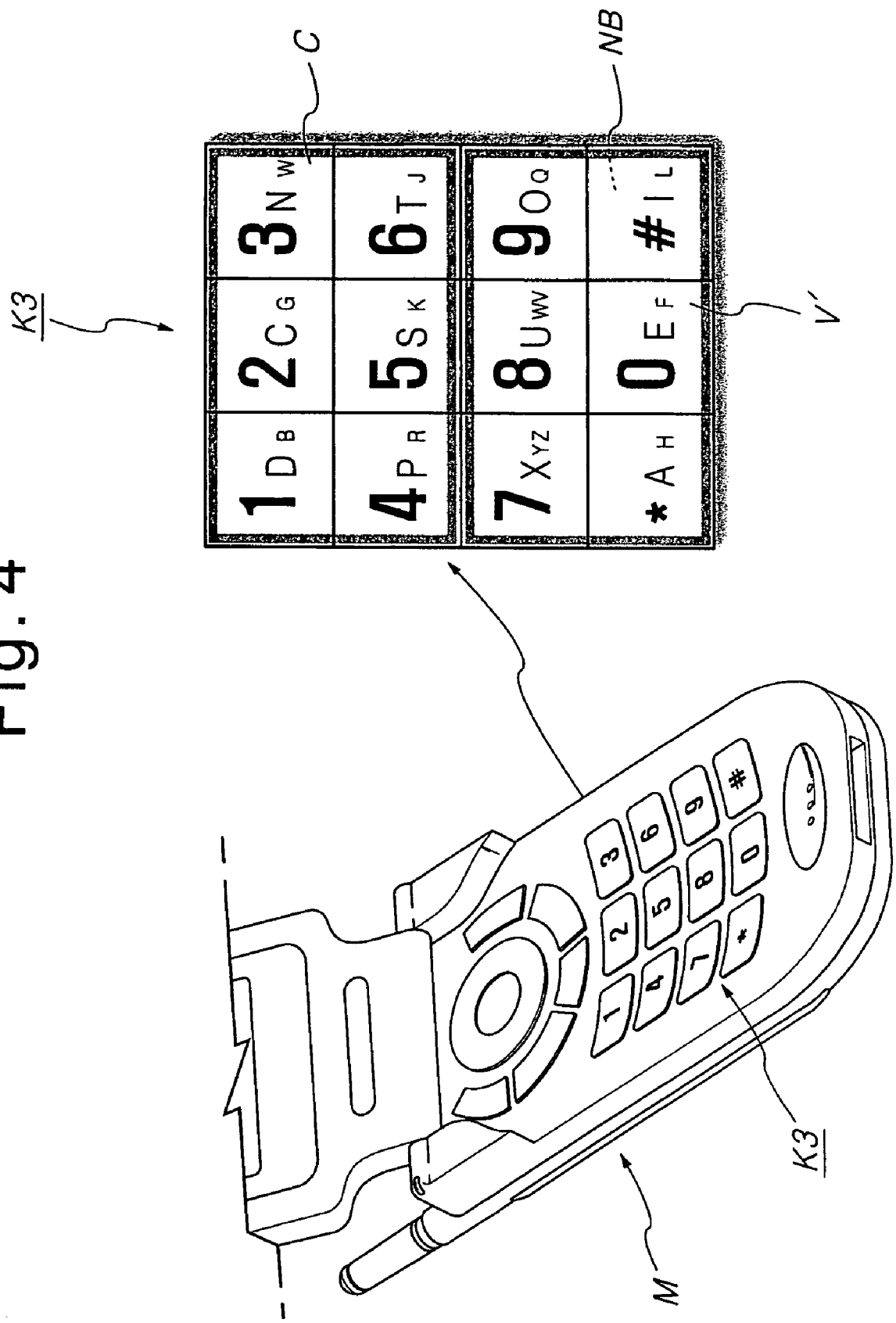
FIG. 4 is a plan view illustrating a conventional portable terminal keypad for use in the input of alphabetic letters in accordance with a third embodiment of the present invention.

FIG. 1 is a plan view illustrating a conventional portable terminal keypad for use in the input of alphabetic letters. FIGS. 2 to 4 are plan views illustrating a conventional portable terminal keypad for use in the input of alphabetic letters in accordance with first to third embodiments of the present invention. Also, FIG. 5 illustrates a fourth embodiment of the present invention, which is applicable for the input of pronunciation of Chinese characters.

Referring to FIG. 1, a conventional representative cellular phone M is illustrated in perspective view, and a keypad K of the cellular phone M is illustrated in plan view. As shown in FIG. 1, the conventional keypad K includes: a plurality of key buttons B printed with alphabetic letters of English. In the conventional keypad K, the alphabetic letters of English are classified into groups of two or three in sequence, such as for example, QZ, ABC, DEF, GHI, etc., so as to be regularly allotted to the plurality of key buttons B. In the conventional keypad K, such a grouping of alphabetic letters is performed without consideration of frequency of use or geometrical shape of the alphabetic letters.

In fact, the above described keypad array is the simplest keypad array for allotting the overall alphabetic letters to a limited number of key buttons. Accordingly, the above described keypad array is currently used in most of cellular phones that are commercialized in English, Chinese and other cultures around the whole world.

However, the key buttons B of the conventional keypad K having the above described configuration may cause inconvenience to some people, more particularly, most people of nations not accustomed to English language.

Most people who are not familiar with English language find it impossible to remember which key buttons B alphabetic letters of English are allotted to.

With the above described conventional keypad array wherein the alphabetic letters of English are simply classified into groups of two or three in sequence, a user first must find which English alphabet group G of key buttons B a desired letter to be inputted belongs to.

Then, the user must also find a relative position of the desired letter on the relevant key button B since two or three alphabetic letters are allotted to each key button B. After finding the relative position of the desired letter, the user must repeatedly push the relevant key button B until the desired letter is selected.

For example, if the desired alphabetic letter to be inputted is "K", the user first must recognize that the desired alphabetic letter "K" is allotted to the English alphabet group G of the key button B printed with an Arabic numeral "5". The Arabic numeral key button "5" contains three alphabetic letters of English, and therefore, the user also must recognize that the desired alphabetic letter "K" is located in the second position of the English alphabet group G printed on the Arabic numeral key button "5". Finally, the desired alphabetic letter "K" is able to be selected and displayed by pushing the Arabic numeral key button "5" twice.

As will be appreciated from the above description, the conventional keypad array and input method requires a great attention and concentration for the input of alphabetic letters of English. Due to such a difficulty in the input of alphabetic letters of English, in particular, people of nations who are not familiar with English language tend to use alphabetic letters of their native language when he/she has to input English words. This becomes the main cause of preventing a development of English message transfer service using cellular phones in nations of Chinese culture and other cultures, except for English culture.

To provide a solution of the above described problems, inventors of the present invention develop an improved new keypad array as shown in FIG. 2. Also, the inventors of the present invention present a variety of modifications based on the same technical idea as the keypad array of FIG. 2.

Now, the configuration of the keypad in accordance with the first embodiment of the present invention will be explained with reference to FIG. 2.

As shown in FIG. 2, the keypad K1 in accordance with the first embodiment of the present invention includes an array of a plurality of key buttons NB.

In the present embodiment, vowels of alphabetic letters of English, i.e. "A", "E", "I", "O" and "U", are allotted to five key buttons NB, respectively, to form a vowel input portion V. As known, the vowels "A", "E", "I", "O" and "U" show a high frequency of use, and therefore, the five key buttons NB are preferably arranged at selected positions that are close to the user's finger and suitable to bring about a high visibility. As shown in FIG. 2, for example, the five key buttons NB are arranged along the leftmost vertical line and the leftmost position of the lowermost line of the keypad K1.

The remaining alphabetic letters of English, i.e. consonants, are allotted to the remaining key buttons NB of the keypad K1, to form a consonant input portion C. Specifically, most of the consonants are allotted to the key buttons NB of the consonant input portion C, but the remaining consonants are allotted to the five key buttons NB of the vowel input portion V.

In the present invention, the consonants of English alphabet are classified into groups of two, and allotted to the overall key buttons NB of the consonant input portion C of the keypad K1, such that the two consonants allotted to each key button NB have a geometrical shape similar to each other. In addition to some consonants allotted to the key buttons NB of the vowel input portion V, the plurality of groups of consonants are arranged from the uppermost key buttons NB of the consonant input portion C in sequence, so as to be regularly allotted to the key buttons NB of the consonant input portion C.

Considering the grouping manner of the present invention in more detail, for example, two alphabetic letters of English, i.e. the consonants "D" and "B" having a geometric shape similar to each other, are grouped with each other. Similarly, based on their similar geometrical shape, the consonant "C" is grouped with the consonant "G", the consonant "N" is grouped with the consonant "M", the consonant "P" is grouped with the consonant "R", and the consonant "T" is grouped with the consonant "J". Meanwhile, as an exceptional case, the consonant "S" is grouped with the consonant "K" although they have no point of similarity.

Also, some consonants are grouped with the vowels having a geometric shape similar thereto. For example, the consonants "W" and "V" are grouped with the vowel "U" of the vowel input portion V, the consonant "H" is grouped with the vowel "A", the consonant "F" is grouped with the vowel "E", a consonant "L" is grouped with the vowel "I", and the consonant "Q" is grouped with the vowel "O". Meanwhile, the consonant "Y" is also referred to as a semivowel, and therefore, is allotted to the rightmost key button of the vowel input portion V, while being grouped with consonants "X" and "Z" based on a similarity in geometrical shape and seriality.

In the groups of consonants and of the consonant(s) and vowel, one letter of each group having the simplest geometrical shape is set to be a representative letter of the relevant key button NB. Here, the representative letter is larger than the other letter(s), and is located at the foremost position of the letters.

For example, considering one key button NB of the consonant input portion C, to which an Arabic numeral "2" and the consonants "D" and "B" are allotted, the consonant "D" has the simplest geometrical shape, and therefore, is set to be a representative letter.

Exceptionally, in the case of the consonant "F" that is grouped with the vowel "E" of the vowel input portion V, and in the case of the consonant "V" and the vowel "U" that are grouped with the consonant "W", although the consonants "F", and "V" and the vowel "U" have a geometrical shape simpler than the vowel "E" and the consonant "W", they have a lower frequency of use than the vowel "E" and the consonant "W". Therefore, the vowel "E" and the consonant "W" are set to be representative letters.

Referring to FIG. 4 illustrating a third embodiment of the present invention, the vowel input portion V may occupy a lower section of a keypad K3, rather than occupying the leftmost vertical line of the keypad as shown in FIG. 2. Accordingly, it will be easily appreciated that the position of the vowel input portion V is variable so long as the vowel input portion V is positioned to have a high accessibility of the user's finger. That is, the shape and position of the vowel input portion V can be determined in accordance with the size and model type of cellular phones.

FIG. 3 illustrates a keypad in accordance with a second embodiment of the present invention, which is based on the configuration of the keypad in accordance with the first embodiment of the present invention. Hereinafter, only differences between the first embodiment and the second embodiment will be explained.

As shown in FIG. 3, in the keypad K2 according to the second embodiment of the present invention, the vowel "I" of the vowel input portion V is grouped with the consonant "J" instead of the consonant "L" of the first embodiment. Also, the consonant "S" and the semivowel "Y" of the vowel input portion V are grouped with the consonant "Z" and the combination of consonants "X" and "K", instead of the consonant "K", and the combination of consonants "X" and "Z" of the first embodiment.

The above described grouping manner of the present embodiment is not based on a similarity in geometrical shape of alphabetic letters, but based on experimental results in that the letters grouped in the above described manner show a high sequential appearance percentage in words that are frequently used in daily life.

Hereinafter, the use example and operational effects of the keypad of a portable terminal for the input of alphabetic letters in accordance with the present invention will be explained.

In the present invention, based on the fact that the vowel input portion V shows a high frequency of use when inputting words, the position of the vowel input portion V is first selected, and then, the position of the consonant input portion C is determined with respect to the vowel input portion V. Also, as stated above, the consonants and vowels of English alphabet are classified into groups of two or three based on a similarity in geometrical shape of alphabetic letters.

With the keypad array of the present invention as stated above, even if the user does not remember a specific consonant-and-vowel grouping manner, he/she can easily associate the groups of alphabetic letters. This has the effect of simplifying a search and recognition procedure of the alphabetic letters. Also, the vowels, having a high frequency of use, are set to be representative letters of relevant key buttons, and therefore, each vowel is located at a foremost position of the group of alphabetic letters of the relevant key button. This accomplishes a considerable reduction in the total number of times the key button must be pushed.

For example, it can be easily appreciated that the alphabetic letters "D" and "B" are allotted to the same key button NB such that the letter "D" is located in front of the letter "B", and the alphabetic letters "P" and "R" are allotted to the same key button NB such that the letter "P" is located in front of the letter "R".

With the keypad array as stated above, the keypad of a portable terminal for the input of alphabetic letters in accordance with the present invention has the following important characteristics.

Firstly, the vowels, having a high frequency of use, are grouped to form the vowel input portion V of the keypad, and are set to be representative letters of the relevant key buttons NB of the vowel input portion V.

Secondly, the consonants are classified into groups of two or three based on a similarity in geometrical shape, and are allotted to the respective key buttons NB of the consonant input portion C.

Thirdly, as a result of grouping alphabetic letters based on a similarity in geometrical shape and frequency of use, the total number of times the key buttons NB must be pushed can be largely reduced, and a more easy and rapid identification and association of the alphabetic letters is possible. This results in a great improvement in input efficiency of alphabetic letters of English.

Now, considering the following practical example, the operational effects of the present invention can be more clearly understood.

Assuming that a user intends to transfer a message "HEY EVERYONE DINNER TONIGHT AROUND 9 ? DOWNTOWN I GUESS", when using the conventional keypad K of FIG. 1, the user must push the key buttons B a total of approximately ninety five times except for a symbol.

However, when using the keypad K1 of FIG. 2 in accordance with the present invention, the total number of times the key buttons NB must be pushed to transfer the above message is considerably reduced to approximately fifty five.

As another example, assuming that the user intends to transfer a message "DO YOU HAVE ANY PLAN TUESDAY? WHY DON'T WE GO TO OLD SCHOOL TO HAVE SOME DRINK?", when using the conventional keypad K of FIG. 1, the user must push the key buttons B a total of approximately one-hundred twenty-nine times. However, when using the keypad K1 of FIG. 2, the total number of times the key buttons NB must be pushed to complete the above message is reduced to approximately seventy eight, showing a reduction rate of 40% or more.

FIG. 5 illustrates a keypad K4 for the input of Chinese language using alphabetic letters of English in accordance with a fourth embodiment of the present invention.

In the case of Chinese language using a plurality of Chinese characters, pronunciation of the respective Chinese characters is able to be represented by use of alphabetic letters of English. That is, English pronunciation of Chinese characters is able to be inputted by use of the keypad in accordance with the present invention, in the same manner as the above described input manner.

However, the pronunciations of some Chinese characters also include grouped vowels, such as diphthong and nasal vowels. These diphthong and nasal vowels show a high frequency of use, and therefore, are necessary to be grouped with each other and allotted together to respective key buttons of the keypad K4 as shown in FIG. 5.

Here, the nasal vowels of Chinese characters have pronunciations of "ANG", "ENG", "ING", "ONG", "IAN", and "UAN", and the diphthong has a pronunciation of "IAO".

Now, the array of the keypad K4 will be explained with reference to FIG. 5.

In the keypad K4, based on a similarity in geometrical shape and phonetic necessity, the nasal vowel "ANG" ought to be grouped with the vowel "A" of the key button NB of the vowel input portion V, the nasal vowel "ENG" ought to be grouped with the vowel "E" of the vowel input portion V, the nasal vowel "ING" ought to be grouped with the vowel "I" of the vowel input portion V, and the nasal vowel "ONG" ought to be grouped with the vowel "O" of the vowel input portion V. Also, as exceptional cases, the nasal vowels "IAN" and "UAN" are arranged close to the nasal vowels "ING" and "ONG", respectively, and the diphthong "IAO" is arranged close to the nasal vowel "IAN".

Arranging the nasal vowels "IAN" and "UAN" close to the nasal vowels "ING" and "ONG" and arranging the diphthong "IAO" close to the nasal vowel "IAN" are based on a similarity in geometrical shape. Accordingly, the array of these exceptional nasal vowels and diphthong are also able to be easily recognized.

Of course, it will be appreciated that whether the foremost vowel "A" is selected or the rearmost nasal vowel "ANG" is selected when the relevant key button NB is pushed is able to be determined in various manners. For example, selection of one of the letters allotted to each key button is determined by regulating a push time of the relevant key button NB, or by use of a specific functional button provided on the keypad.

Although the above description of the present invention exemplifies English and Chinese languages, it will be appreciated that the present invention is also applicable to French, Spanish, German, and other languages so long as the relevant language uses alphabetic letters or their pronunciation can be represented by use of alphabetic letters. Accordingly, the present invention can be modified in various manners suitable to languages of various nations where the keypad of the present invention is commercialized.

As apparent from the above description, the present invention provides a keypad of a portable terminal for the input of alphabetic letters, which can solve problems of a conventional keypad in which consonant and vowels are meaninglessly grouped, and therefore, a repetitive and sequential input process is required. In accordance with the present invention, alphabetic letters of English, allotted to a plurality of key buttons of the keypad, are grouped based on a similarity in geometrical shape. Such a grouping of the alphabetic letters provides a user with an easy and rapid recognition and association of relevant key buttons, resulting in an efficient metal and ergonomic keypad design.

Furthermore, with the keypad of the present invention, the total number of times the key buttons must be pushed can be largely reduced, resulting in a more convenient physical manipulation of the keypad, and achieving an increase in efficiency of message transfer. The keypad of the present invention can be applied to any kind of portable terminal, such PDA, GPS and MP3 having input keypad for operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A keypad of a portable terminal including an array of a plurality of alpha-numeric key buttons for the input of alphabetic letters of the English language, comprising:
    a vowel input portion including a plurality of key buttons, to which vowels of the English alphabet showing high frequencies of use are allotted, and some consonants of the English alphabet are also allotted, the key buttons of the vowel input portion being grouped together; and
    a consonant input portion including the remaining key buttons of the keypad, to which the remaining consonants of the English alphabet are allotted,
    wherein the consonants and vowels of the English alphabet are classified into groups of two or more based on a similarity in geometrical shape thereof, and the resulting groups are allotted to the key buttons of both the consonant input portion and the vowel input portion, and
    wherein one consonant or vowel of the group allotted to each of the key buttons, having the simplest geometrical shape, is set to be a representative letter of the key button.

2. The keypad as set forth in claim 1,
    wherein the plurality of consonants of the English alphabet, which are allotted to the key buttons of the consonant input portion and the vowel input portion of the keypad, are grouped based on a similarity in geometrical shape to achieve an easy association therebetween, one consonant of each group, having the simplest geometrical shape, being set to be a representative letter of the relevant key button, and
    wherein, when the vowel "E" and the consonant "F" are allotted to the same key button of the vowel input portion, and when the vowel "U" and the consonants "W" and "V" are allotted to the same key button of the vowel input portion, exceptionally, the vowels "E" and "U" are set to be representative letters of the relevant key buttons since the consonants "F" and "V", having the simplest geometrical shape, have a lower frequency of use than the vowels "E" and "U".

3. The keypad as set forth in claim 1, wherein the key buttons of the vowel input portion, to which the vowels of the English alphabet showing a high frequency of use are allotted, are vertically arranged in sequence from an upper end of the leftmost portion of the keypad.

4. The keypad as set forth in claim 1, wherein some of the consonants and vowels of both the consonant input portion and the vowel input portion are grouped based on a sequential appearance frequency in words, rather than being grouped based on a similarity in geometrical shape.

5. The keypad as set forth in claim 1, wherein, based on a sequential appearance frequency in words, the vowel "I" of the vowel input portion is grouped with the consonant "J" instead of the consonant "L", the consonant "S" of the consonant input portion is grouped with the consonant "Z" instead of the consonant "K", and the semivowel "Y" of the vowel input portion is grouped with a combination of consonants "X" and "K" instead of a combination of consonants "X" and "Z".

6. The keypad as set forth in claim 1, wherein the vowel input portion, including the vowels of the English alphabet showing high frequencies of use, are able to be positioned in a freely selected position of the keypad.

7. The keypad as set forth in claim 1,
    wherein the consonants of the consonant input portion are grouped in such a fashion that, based on a similarity in geometrical shape, the consonant "D" is grouped with the consonant "B", the consonant "C" is grouped with the consonant "G", the consonant "N" is grouped with the consonant "M", the consonant "P" is grouped with the consonant "R", and the consonant "T" is grouped with the consonant "J", and exceptionally, the consonant "S" is grouped with the consonant "K" although they have no point of similarity in geometrical shape, and
    wherein the consonants of the vowel input portion are grouped in such a fashion that, based on a similarity in geometrical shape, the consonants "W" and "V" are grouped with the vowel "U", the consonant "H" is grouped with the vowel "A", the consonant "F" is grouped with the vowel "E", the consonant "L" is grouped with the vowel "I", and the consonant "Q" is grouped with the vowel "O", and the consonant "Y", which is also referred to as a semivowel, is grouped with the consonants "X" and "Z" based on a similarity in geometrical shape and seriality.

8. The keypad as set forth in claim 1, wherein, when the alphabetic letters of English are used to input pronunciation of Chinese characters, each nasal vowel is allotted to one of the key buttons of the vowel input portion, which has a representative letter having a pronunciation similar to that of the nasal vowel, and a diphthong is allotted to the key button of one nasal vowel that has a similarity in geometrical shape and pronunciation with the diphthong.

* * * * *